United States Patent Office 3,003,428
Patented Oct. 10, 1961

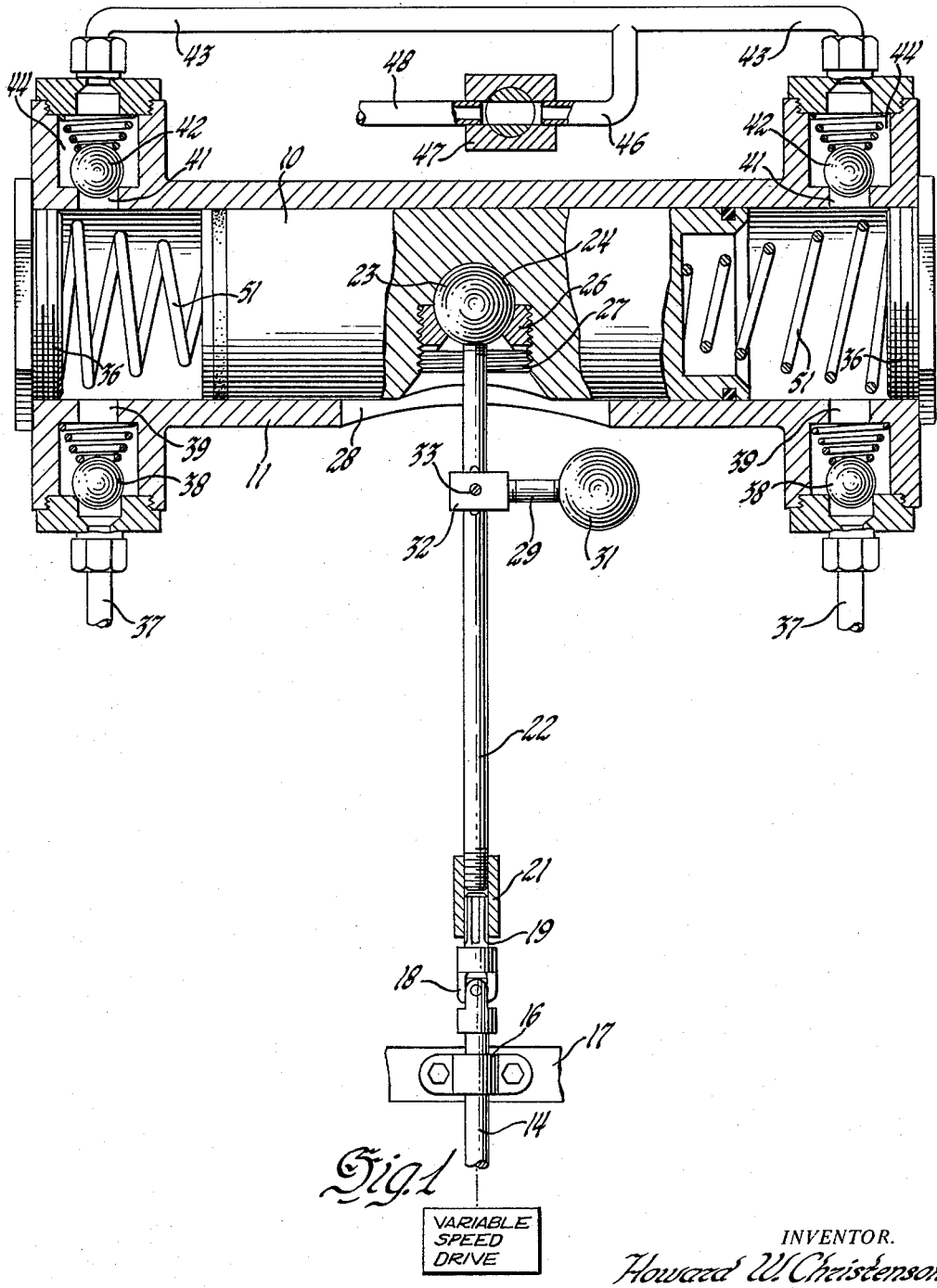

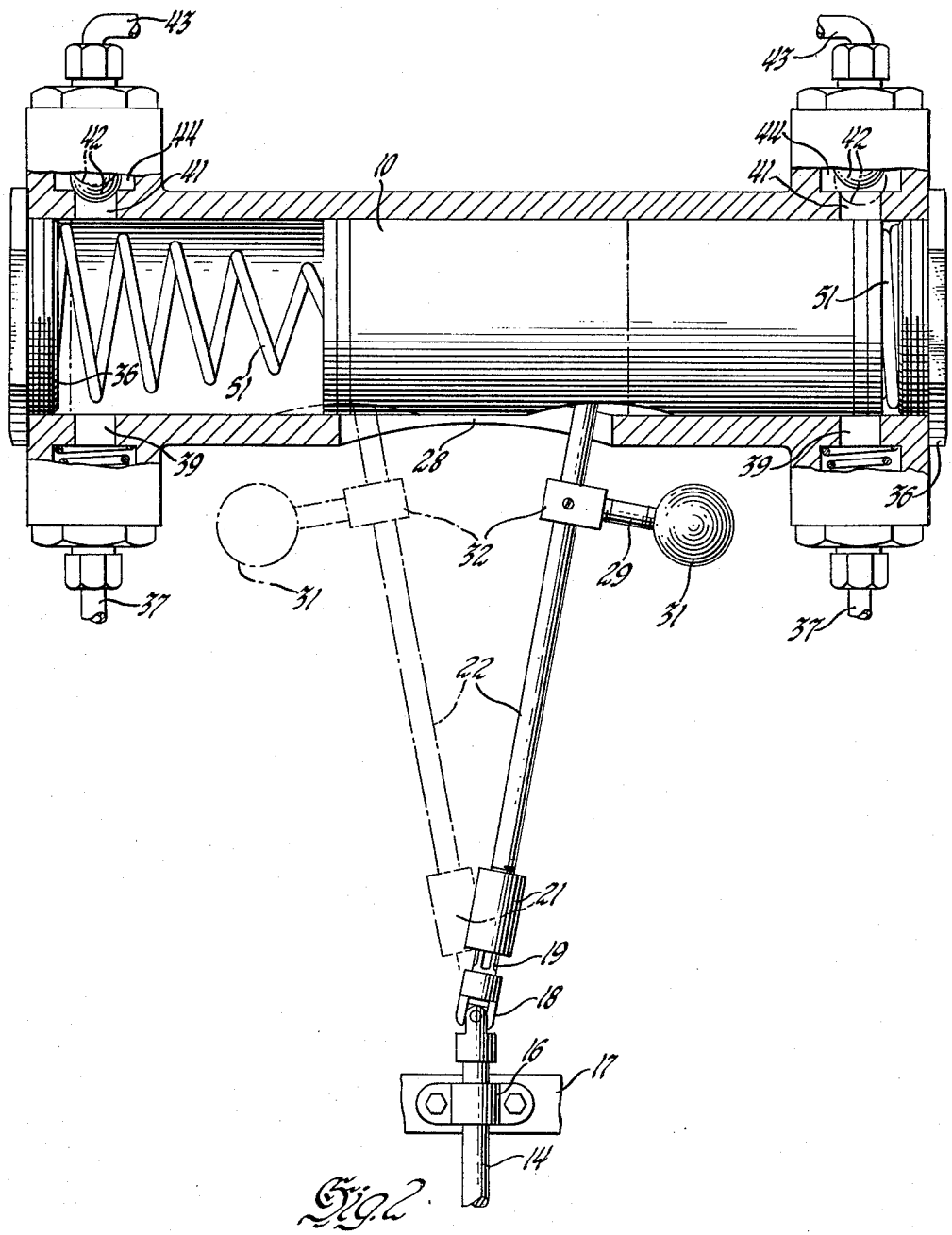

3,003,428
PUMP
Howard W. Christenson, Indianapolis, Ind., assignor to General Motors Corporation, Detroit, Mich., a corporation of Delaware
Filed June 13, 1958, Ser. No. 741,791
13 Claims. (Cl. 103—175)

This invention relates to a pump and more particularly to a variable displacement constant pressure pump.

This variable displacement pump automatically provides a variable volume of fluid at a constant pressure. The pump employs a power source which provides a constant force acting on a movable wall of the pump chamber. The power source consists of a rotating weight on the movable wall which, due to the action of centrifugal force, provides a reciprocating force to reciprocate the movable wall in a cylinder having a pumping chamber on each side of a movable wall. The weight may be rotated at a constant speed to provide a constant pump pressure. The reciprocating movement of the piston pumps fluid to the pump outlet until the pressure in the outlet and the pumping pump chamber increases to a value sufficient to resist movement of the piston, due to the centrifugal force of the weight. During normal operation of the pump the piston will reciprocate only to the extent required to supply the fluid demand on the pump. When there is no demand on the pump the piston will be held stationary.

It is an object of the invention to provide a variable displacement constant pressure pump actuated by a constant reciprocating force.

It is another object of the invention to provide a variable displacement constant pressure pump having a movable wall actuated by the force of a rotating mass.

It is another object of the invention to provide a variable displacement constant pressure pump having a reciprocating piston located in a cylinder providing a double ended pump chamber and having a rotating mass mounted on the piston to reciprocate the piston in the pump chamber.

These and other objects of the invention will be more apparent from the following description of the preferred embodiment illustrated in the accompanying drawings.

FIGURE 1 is a diagrammatic illustration of the pump in the central position.

FIGURE 2 is a diagrammatic illustration of the pump illustrating the maximum degree of movement of the piston.

The pump shown in FIGURE 1 is illustrative of a variable displacement constant pressure pump made in accordance with this invention. The pump has a piston 10 reciprocally mounted within a cylinder 11. The pump is driven by a suitable power source connected to the shaft 14 which is rotatably mounted in a bearing 16 fixed to a stationary frame member 17. The input shaft 14 is connected by a universal joint 18 to the splined shaft 19. A suitable splined coupling member 21 is splined to the splined shaft 19 to transmit rotary drive and permit axial sliding movement and fixed by thread or other suitable securing means to the shaft 22. The shaft 22 is rotatably mounted in the ball 23 which is universally supported on the piston 10 in a spherical recess 24 and spherical retainer 26 secured by threads or other suitable means in a recess 27 of the piston 10. The shaft 22 may also be fixed to ball 23. Then the ball will, in addition to providing angular movement between the piston 10 and shaft 22, permit rotation of the ball 23 and shaft 22. The shaft 22 passes through the slot 28 in the wall of cylinder 11. The ball is preferably mounted on the axis of the piston 10 so that the shaft does not exert any turning moment on the piston and thus the shaft 22 need not be guided by the slot 28. An arm 29 is fixed to the shaft 22 for rotation therewith and carries at its extremities a weight 31. The arm 29 may be secured to the shaft 22 by an adjustably positioned slide block 32, suitably apertured to receive the shaft 22 and retained in position by a set screw 33 to axially adjust the arm 29 and weight 31 on the shaft to change the predetermined output pressure of the pump.

Each end of the cylinder 11 is closed by a suitable cylinder head 36. The inlet lines 37 are connected through one-way suitable check valves 38 permitting flow only to the inlet ports 39. Similarly, the outlet ports 41 are connected through one-way check valves, only permitting flow out of the operating chambers 44 to the outlet lines 43. The outlet lines 43 are connected to a main line 46 which may be controlled by a suitable control valve 47 to supply fluid to the pressure supply line 48 for a fluid control or actuating system. Centering springs 51 may also be provided in each end of the cylinder.

The pump is operated by supplying power from a suitable source through the shaft 14, universal joint 18 and coupling 21 to rotate the shaft 22 and the pendulous weight 31. The reaction to the centrifugal force of the rotating weight 31 will tend to move the position 10 in the same direction. The weight 31 is thus guided for rotary movement and the inertia forces are transmitted to the piston 10 by this rigid structural mechanism. Thus, when the pendulous weight rotates, the piston 10 will reciprocate in phase. The reciprocating piston 10 will, in accordance with the conventional pump practice, draw fluid from the source through the inlet lines 37, check valves 38 and inlet ports 39 to the operating chambers at each end of the cylinder and expell the fluid through the ports 41 to check valves 42 to the outlet lines 43. It will be noted that since the inlet ports 39 and the outlet ports 41 are spaced from the end of the cylinder or the head 36, that a small slug of fluid will always be trapped at the ends of the cylinder to prevent the piston from hitting the head 36 at the end of the cylinder. The piston 10 will continue to reciprocate until the pressure in the output lines 43 and the pumping chambers is raised to the designed pressure. At this point the force exerted by the pendulous weight 31, rotating at the constant input speed of shaft 14, will exactly balance the pressure of the fluid. At this point reciprocation of piston 10 will cease. Thereafter during the operation of the pump whenever fluid is withdrawn for use in the system a reduction in pressure will permit the piston 10 to reciprocate to supply the fluid demand of the system. Thus, this variable displacement pump provides a constant pressure source for a variable volume demand system. When the pump is not required to supply fluid the piston ceases movement and thus wear on the pump is greatly reduced and the power input required is substantially reduced.

The output pressure of the pump may be varied by controlling the speed of the input shaft 14 by a conventional variable speed drive such as a variable speed motor or a motor and a variable speed transmission. An increase in input speed will increase the pump pressure. An increase in the size of the weight 31 or the length of the lever arm 29 will also increase the output pressure of the pump. The centrifugal force supplied by the weight 31 is $W\omega^2 r/g$ where $W$ is the weight, $\omega$ is the angular velocity of the weight about the body in radians, $r$ is the distance from the center of gravity of the weight to the axis about which it rotates and $g$ is the gravitational constant.

Movement of the weight 31 along the axis of the shaft 22 toward the ball 23 will also increase the pressure since the lever arm distances from the universal joint 18 to the weight 31 and to the ball 23 will be changed. The position of the weight may be changed when the pump is stopped by loosening set screw 33 and sliding the block 32 along the shaft 22. This adjustment may also be made when the pump is operating by a flexible or pivoted link linkage mounted along the shaft and connected to the block and connected by a rotary joint to an operator.

The above described preferred embodiment of the invention is illustrative of the invention and modifications will be apparent to those skilled in the art within the scope of the appended claims.

I claim:

1. In a pump, a housing having an operating chamber, a movable wall within said chamber, inlet and outlet means connected to said chamber including valve means controlling the entrance of fluid and discharge of fluid under pressure from said chamber, rotatable means mounted on said movable wall for rotation about an axis and fixed at a point on said movable wall to apply a controllable operating force having a controllable value in response to speed of rotation on said movable wall to operatively move said movable wall to supply a predetermined controllable pressure to said outlet means and incapable of moving said movable wall when the fluid in said outlet means is at said predetermined controllable pressure.

2. In a pump, a housing having an operating chamber, a movable wall within said chamber, inlet and outlet means connected to said chamber including valve means controlling the entrance of fluid and discharge of fluid under pressure from said chamber, rotatable weight means mounted on said movable wall for rotation about an axis and fixed at a point on said movable wall to apply a controllable operating force having a controllable value in response to speed of rotation on said movable wall and the weight of said weight means to operatively move said movable wall to supply a predetermined controllable pressure to said outlet means and incapable of moving said movable wall when the fluid in said outlet means is at said predetermined controllable pressure.

3. In a pump, a housing having an operating chamber, a movable wall within said chamber, inlet and outlet means connected to said chamber including valve means controlling the entrance of fluid and discharge of fluid under pressure from said chamber, inertia force means including a rotatable weight, drive means operatively connected to said inertia force means to rotatably drive said weight to provide an inertia force, and means operably connecting said weight to said movable wall to continuously transfer said inertia force to said movable wall to apply a controllable operating force operative to provide a controllable predetermined force to said movable wall to move said movable wall to supply a predetermined controllable pressure to said outlet means and incapable of moving said movable wall when there is no fluid demand and the fluid in said outlet means is at said predetermined controllable pressure, and control means to variably control said inertia force means to vary said inertia force to vary said predetermined pressure.

4. In a pump, a housing having an operating chamber, a movable wall within said chamber, inlet and outlet means connected to said chamber including valve means controlling the entrance of fluid and discharge of fluid under pressure from said chamber, weight means, mounting means rigidly mounted on said movable wall and confining said weight means for rotary movement at a point on said movable wall with respect to said movable wall to provide a reaction force to move said movable wall to supply a predetermined constant fluid pressure to said outlet means and incapable of moving said movable wall when there is no fluid demand and the fluid in said outlet means is at said predetermined pressure, and means operably connected to said weight means to rotate said weight means to move said movable wall.

5. In a pump, a housing having an operating chamber, a movable wall within said chamber, inlet and outlet means connected to said chamber including valve means controlling the entrance of fluid and discharge of fluid under pressure from said chamber, weight means rotatably mounted for rotation on said movable wall about an axis and fixed to said movable wall at a point providing a reaction force to move said movable wall to supply a predetermined constant fluid pressure to said outlet means and incapable of moving said movable wall when there is no fluid demand and the fluid in said outlet means is at said predetermined pressure, and means operably connected to said weight means to rotate said weight means to move said movable wall.

6. In a pump, a housing having an operating chamber, a movable wall within said chamber, inlet and outlet means connected to said chamber including valve means controlling the entrance of fluid and discharge of fluid under pressure from said chamber, weight means rotatably mounted for rotation on said movable wall on an axis transverse to the direction of movement of the movable wall providing a predetermined constant force to provide a predetermined pressure fluid supply and capable of moving said wall until the fluid in said outlet reaches said predetermined pressure, and means operably connected to said weight means to rotate said weight means to move said movable wall.

7. In a pump, a housing having an operating chamber, a movable wall within said chamber, inlet and outlet means connected to said chamber including valve means controlling the entrance of fluid and discharge of fluid under pressure from said chamber, weight means rotatably mounted for rotation on said movable wall on an axis transverse to the direction of movement of said movable wall operative during rotation to move said movable wall to provide a pressure in said outlet means proportional to the speed of rotation of said weight and inoperative to move said movable wall to provide a higher pressure, means operably connected to said weight means to rotate said weight means at a constant speed to apply a uniform force to move said movable wall to provide a constant pump outlet pressure.

8. In a pump, a cylinder having an axis and closed at both ends, a piston mounted for reciprocal movement along said axis and located in said cylinder dividing said cylinder into operating chambers located at each end of the piston, inlet and outlet means connected to each operating chamber including valve means controlling the entrance of fluid and discharge of fluid under pressure from said chamber, rotating weight means mounted on said piston for rotation about an axis of rotation fixed with respect to a point on said piston and located transverse to said axis of said reciprocal movement of said piston operative during rotation to move said movable wall to provide a pressure in said outlet means proportional to the speed of rotation of said weight and inoperative to move said movable wall to provide a higher pressure, and means operably connected to said weight means to rotate said weight means.

9. The invention defined in claim 8 and means to rotate said weight at a constant speed to provide a constant output pressure.

10. The invention defined in claim 8 and means to vary the rate of rotation of said weight to vary the output pressure.

11. In a pump, a cylinder closed at both ends, a piston mounted for reciprocal movement along an axis and located in said cylinder dividing said cylinder into operating chambers located at each end of the piston, inlet and outlet means connected to each operating chamber, inertia means including a shaft and a rotating weight mounted on said shaft for rotation about an axis of rotation transverse to the axis of reciprocal movement of said piston and operative during rotation to move said movable wall to provide a pressure in said outlet means proportional to the speed of rotation of said weight and inoperative to move said movable wall to provide a higher pressure, means rotatably mounting said shaft on said piston for relative rotary movement between said shaft and said piston along said axis of reciprocation, and means connected to said inertia means to rotate said weight.

12. In a pump; a stationary support; a supply port; a delivery port connected to a pressure system; pumping means including a housing member having a chamber, a movable wall member sealed to said housing to provide a closed pumping chamber and movable with respect to said housing in one direction to increase the volume of said pumping chamber and in another direction to decrease the volume of said pumping chamber, one-way valve means for fluid flow from said supply port into said pumping chamber, and one-way valve means for fluid flow from said pumping chamber to said delivery port; means rigidly attaching one of said members to said support; means including guide means providing a fixed cyclic path with two changes in direction rigidly attached to the other member and weight means connected in continuous positive force transmitting relation with said guide means and movable in a path about said guide means operative at said first change of direction to provide a cyclic inertia force acting on said guide means in said one direction and at said second change of direction to provide an inertia force acting on said guide means in said another direction and drive means connected to said weight means to continuously move said weight means relative to said guide means in said path at a controlled predetermined speed to continuously provide a predetermined cyclic inertia force on said other member able to move said other member only when less than a controlled predetermined maximum pressure is in said pumping chamber and is delivered to said delivery port and unable to move said other member when a pressure equal to or greater than said predetermined maximum pressure is in said pumping chamber to supply a predetermined pressure to the pressure system.

13. In a pump; a stationary support; a supply port; a delivery port connected to a pressure system; pumping means including a housing member having a chamber, a movable wall member sealed to said housing to provide two closed pumping chambers and movable with respect to said housing in one direction to increase the volume of one pumping chamber and decrease the volume of the other pumping chamber and in another direction to increase the volume of said other pumping chamber and to decrease the volume of said one pumping chamber, one-way valve means for fluid flow from said supply port into each of said pumping chambers and one-way valve means for fluid flow from each of said pumping chambers to said delivery port; means rigidly attaching one of said members to said support; means including guide means providing a fixed cyclic path with two changes in direction rigidly attached to the other member and weight means connected in continuous positive force transmitting relation with said guide means and movable in a path about said guide means operative at said first change of direction to provide a cyclic inertia force acting on said guide means in said one direction and at said second change of direction to provide an inertia force acting on said guide means in said another direction and drive means connected to said weight means to continuously move said weight means relative to said guide means in said path at a controlled predetermined speed to continuously provide a predetermined cyclic inertia force on said other member able to move said other member only when less than a controlled predetermined maximum pressure is in each of said pumping chambers and is delivered to said delivery port and unable to move said other member when a pressure equal to or greater than said predetermined maximum pressure is in each of said pumping chambers to supply a predetermined pressure to the pressure system.

References Cited in the file of this patent

UNITED STATES PATENTS

| | | |
|---|---|---|
| Re. 18,518 | Braselton et al. | July 12, 1932 |
| 404,737 | Schroeder | June 4, 1889 |
| 850,078 | Vineyard | Apr. 9, 1907 |
| 991,708 | Fasting | May 9, 1911 |
| 1,000,305 | Smith | Aug. 8, 1911 |
| 1,091,533 | Pierman | Mar. 31, 1914 |
| 1,276,807 | Pierman | Aug. 27, 1918 |
| 1,730,336 | Bellocq | Oct. 1, 1929 |
| 1,730,337 | Bellocq | Oct. 1, 1929 |
| 1,746,693 | Braselton et al. | Feb. 11, 1930 |
| 1,907,673 | Rockwell | May 9, 1933 |
| 1,941,593 | Bellocq | Jan. 2, 1934 |
| 2,056,513 | Gambarini | Oct. 6, 1936 |
| 2,217,287 | McNew | Oct. 8, 1940 |
| 2,232,678 | Dickinson | Feb. 25, 1941 |
| 2,355,618 | Bodine | Aug. 15, 1944 |
| 2,368,013 | Ford | Jan. 23, 1945 |
| 2,440,175 | Katcher | Apr. 20, 1948 |
| 2,444,912 | Bodine | July 13, 1948 |
| 2,553,541 | Bodine | May 22, 1951 |
| 2,553,542 | Bodine | May 22, 1951 |
| 2,624,305 | Herrick et al. | Jan. 6, 1953 |

FOREIGN PATENTS

| | | |
|---|---|---|
| 106,863 | Great Britain | June 7, 1917 |
| 130,332 | Great Britain | July 29, 1920 |
| 146,436 | Great Britain | Nov. 25, 1920 |
| 405,479 | France | Nov. 16, 1909 |
| 850,942 | France | Sept. 25, 1939 |

UNITED STATES PATENT OFFICE
CERTIFICATE OF CORRECTION

Patent No. 3,003,428             October 10, 1961

Howard W. Christenson

It is hereby certified that error appears in the above numbered patent requiring correction and that the said Letters Patent should read as corrected below.

Column 2, line 25, for "position" read -- piston --.

Signed and sealed this 10th day of April 1962.

(SEAL)
Attest:

ERNEST W. SWIDER
Attesting Officer

DAVID L. LADD
Commissioner of Patents